Figure 1:
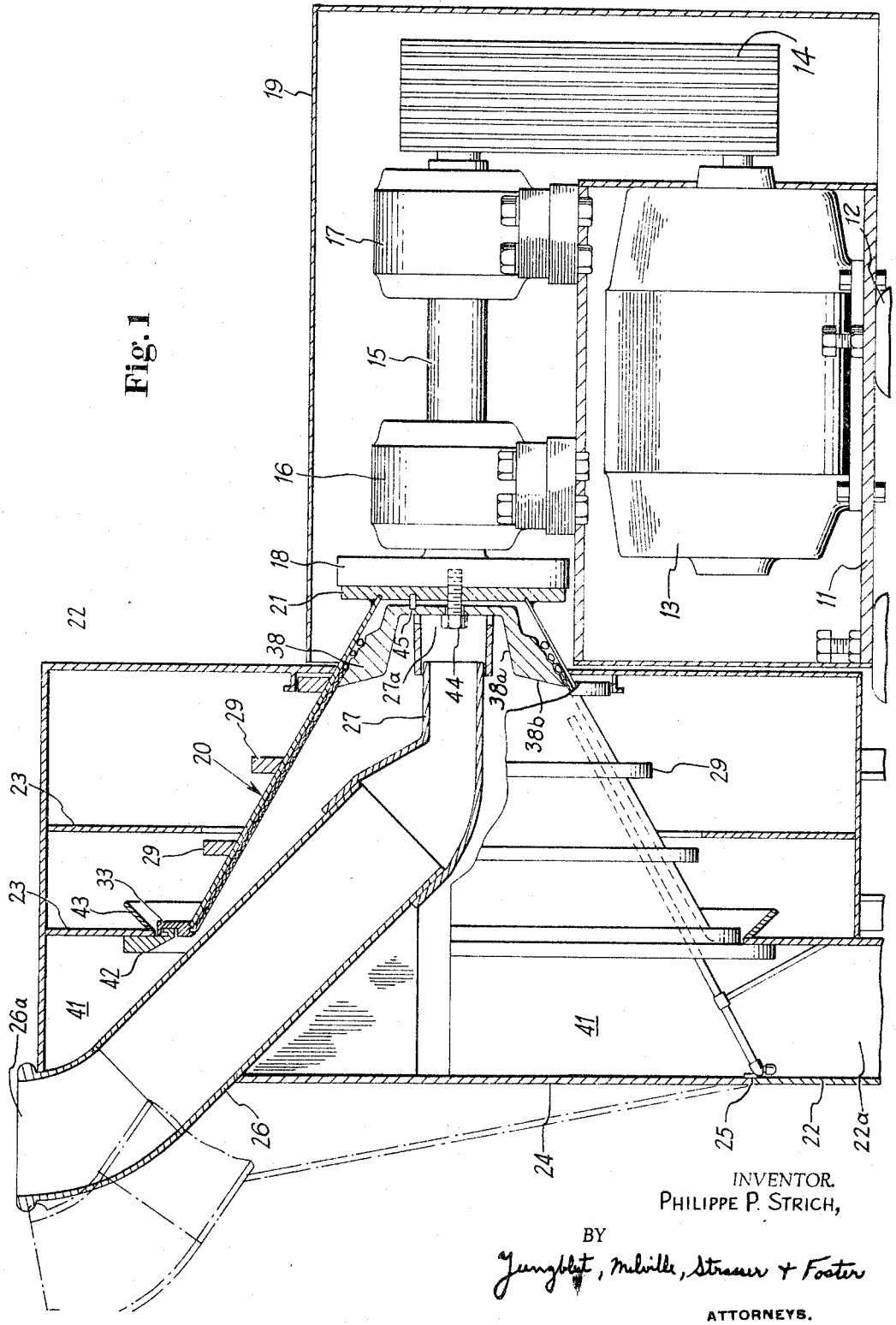

Aug. 30, 1966    P. P. STRICH    3,269,028
CENTRIFUGAL SEPARATOR
Filed Oct. 1, 1962    5 Sheets-Sheet 1

INVENTOR.
PHILIPPE P. STRICH,
BY
Jungblut, Melville, Strauss + Foster
ATTORNEYS.

Aug. 30, 1966    P. P. STRICH    3,269,028
CENTRIFUGAL SEPARATOR

Filed Oct. 1, 1962    5 Sheets-Sheet 4

INVENTOR.
PHILIPPE P. STRICH,
BY
Jungblut, Melville, Strasser & Foster

ATTORNEYS.

United States Patent Office 3,269,028
Patented August 30, 1966

3,269,028
CENTRIFUGAL SEPARATOR
Philippe P. Strich, 10178 Shady Lane, Cincinnati, Ohio
Filed Oct. 1, 1962, Ser. No. 227,425
10 Claims. (Cl. 34—58)

This invention relates to a centrifugal separator which, by means of a high speed one rotating on a horizontal axis, continuously separates the liquid from a solid-liquid slurry and presents the solid material to a convenient receptacle, and more particularly to the construction of the filtering cone for such a separator.

It has been considered in the past that selection of a horizontal axis of rotation for the filtering cone could greatly reduce the number of parts and the problems of construction involved, but for the most part the art has continued to utilize the conventional vertical axis for other reasons. I have devised, however, a construction which makes the use of a horizontal axis practical. Such a device contemplates the continuous feeding of a solid-liquid slurry near the apex of a rapidly rotating cone. The centrifugal force will carry the solid material in a thin layer toward the peripheral base of the cone, while the liquid component will strike through the filtering screen and may be collected by a suitable receptacle.

For exemplary purposes only, it may be stated that the rotational speed of the filtering cone of my device is on the order of 2200 r.p.m. It should, of course, be obvious that these high speeds of operation cause many difficult problems of balance and wear. That is, efficient filtering requires the use of a very fine screen. And of course, the solid material (and initially the solid liquid slurry) will be held against this fine screen under a considerable force. Furthermore, as noted above, the solid material will continuously move along the cone to its periphery. Any slight buckle or unevenness of the surface of this fine screen will greatly increase the rate of wear. Also, it must be remembered that this invention is adapted for industrial usage involving high speed continuous operation, wherein large amounts of heat will probably be generated. The heat so generated will tend to cause the screen to expand, and this too contributes to the tendency toward unevenness.

Various devices presently in use have achieved a fairly smooth surface, but by using a very complicated and expensive construction. And with such devices, when a screen does wear out, replacement is a long, tedious, and expensive proposition.

Accordingly, it is the primary object of my invention to provide a highly efficient centrifugal separator, possessing a large capacity without requiring a large space area.

Another very important object of this invention is to provide a construction for the filtering cone which will greatly increase the working life of the fine screen.

Still another object of my invention is to develop a method of construction which renders the filtering cone easily accessible.

A further object of my invention is to provide a construction for the filtering cone which will render the fine screen easily and quickly replaceable when necessary.

Figure 2:
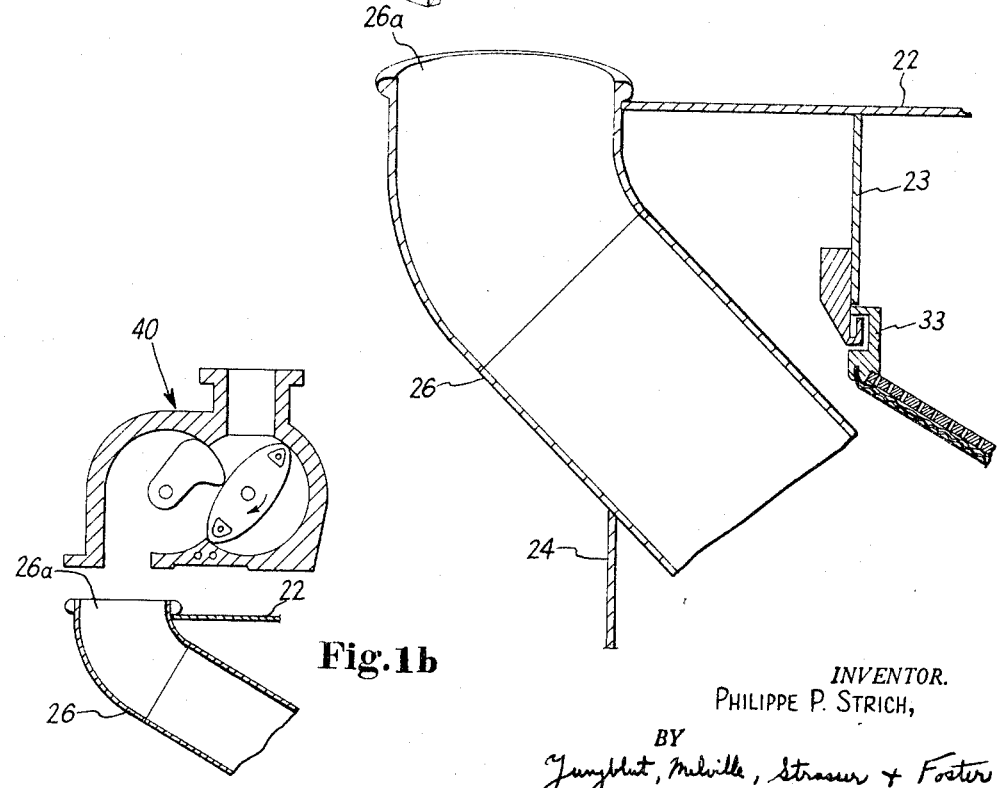
Figure 3:
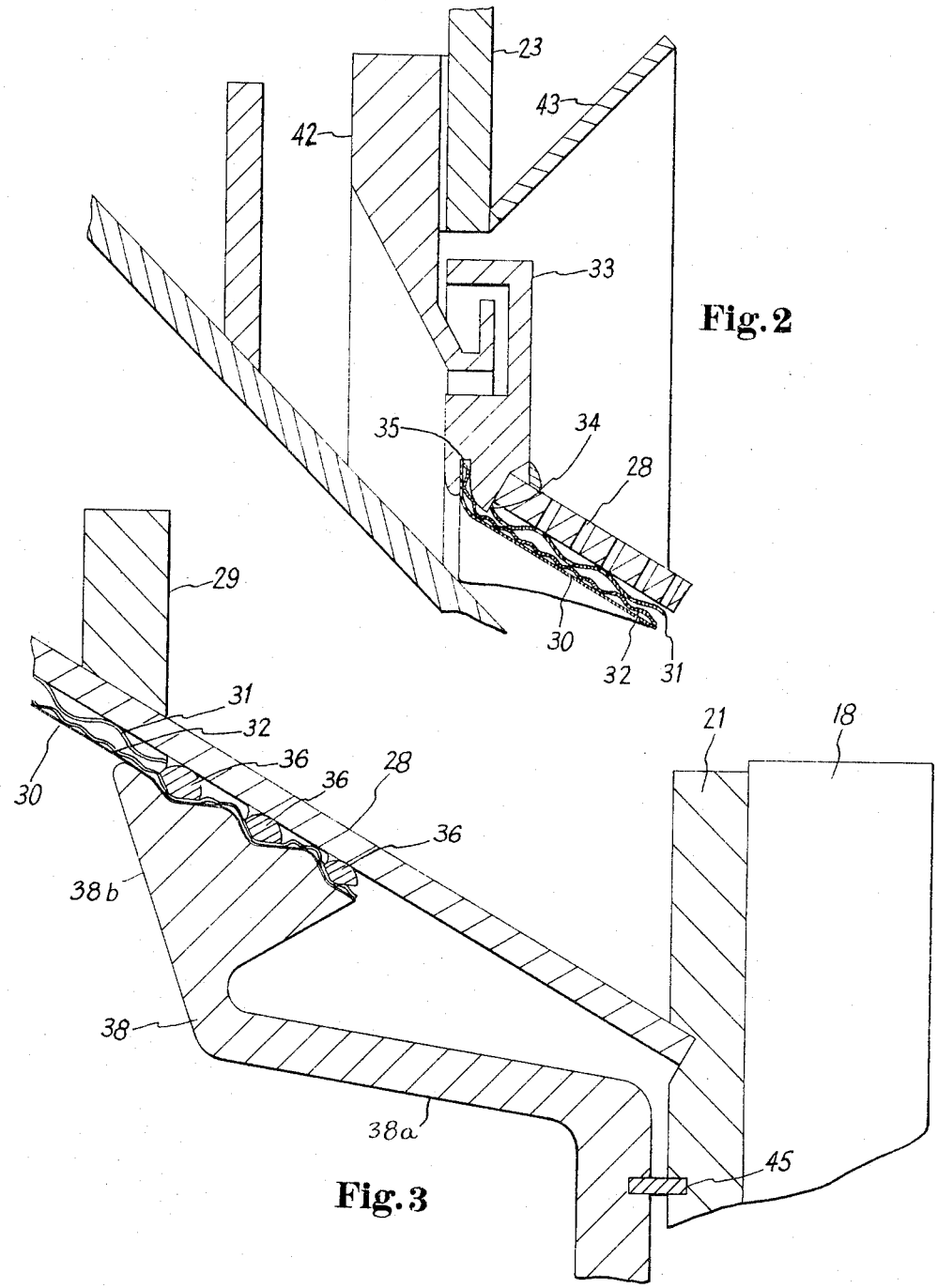
Figure 4:
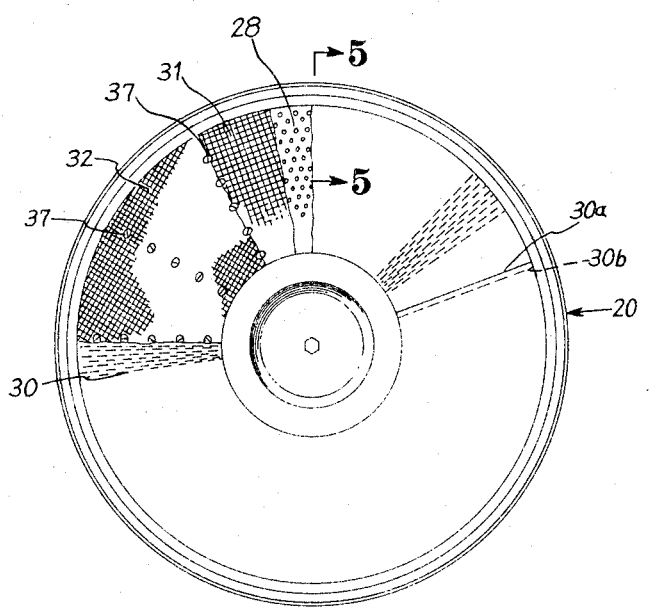
Figure 5:
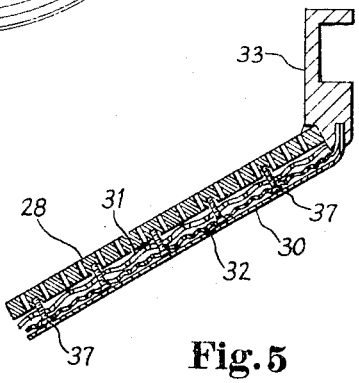
Figure 6:
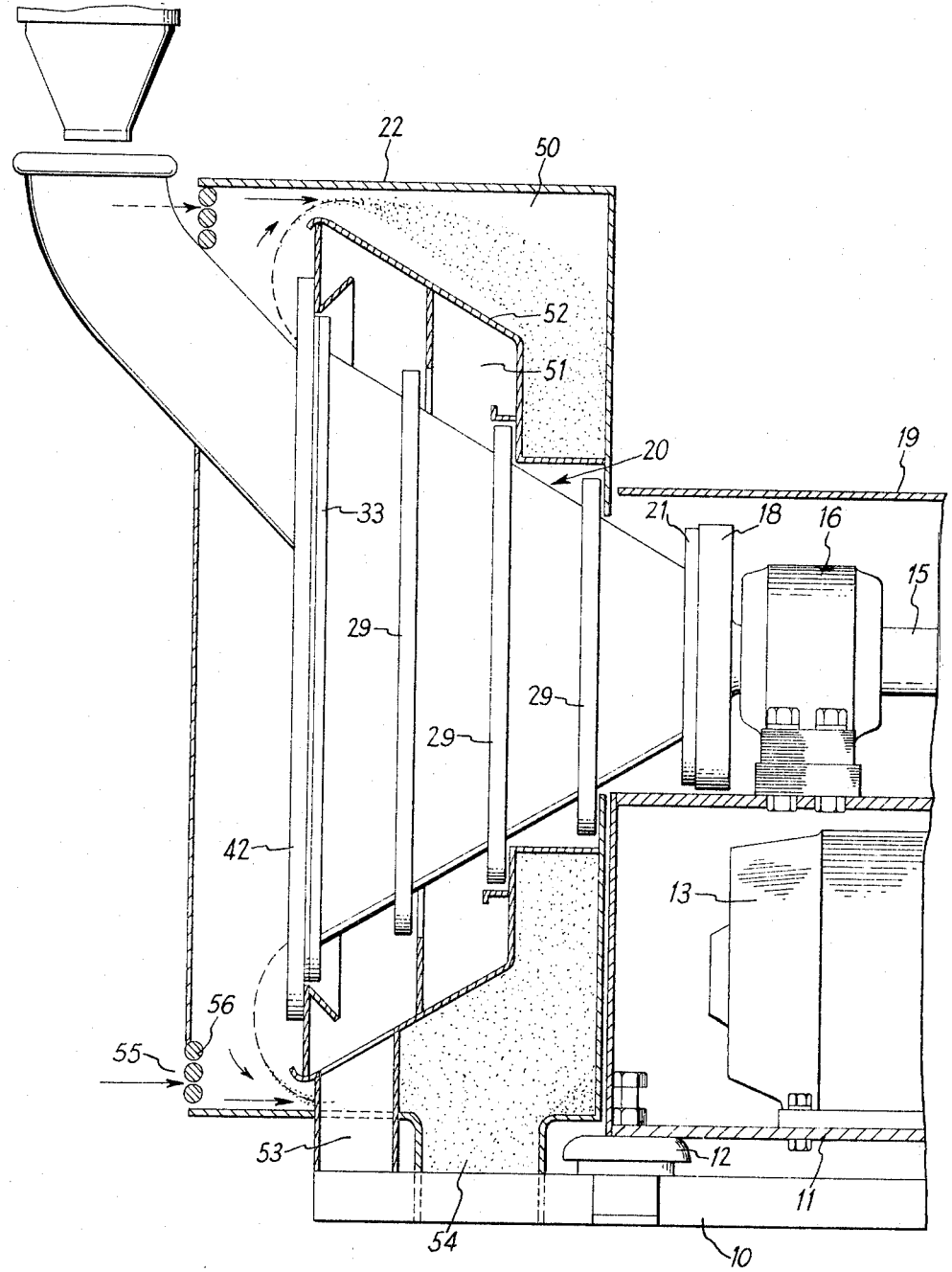

In the accompanying drawing, I have illustrated a specific embodiment by which the above objects may be accomplished. The skilled worker in the art will undoubtedly realize other objects and advantages of my invention as I proceed with a detailed description. In the accompanying drawings, like reference characters have been employed to designate similar parts, and the various views may be described as follows:

FIGURE 1 is a vertical view partly in cross-section showing a centrifugal separator according to my invention;

FIGURE 1a is a perspective view of a valve for controlling the rate of feed to the separator;
FIGURE 1b is a cross-sectional view of a volumetric feed for my separator;
FIGURE 2 is a greatly enlarged view showing the elements of a portion of FIGURE 1 in cross-section;
FIGURE 3 is a greatly enlarged view showing several of the elements of FIGURE 1 in cross-section;
FIGURE 4 is a front elevational view of the filtering cone of my invention;
FIGURE 5 is a cross-sectional view taken along the line 5—5 of FIGURE 4; and
FIGURE 6 is a side elevational view showing a modification of my invention.

Referring first to FIGURE 1, my invention will be described as follows. The main beams (see also FIGURE 6) supporting the machine of my invention are indicated at 10. A motor platform 11 is secured to the beam 10 on conventional rubber mounts 12. A motor 13 of suitable size and diameter is securely mounted on the platform 12, and through the multiple belts 14 drives the horizontal shaft 15 which is journaled in suitable bearings 16 and 17. The shaft 15 at its free end mounts a flange 18 to which the filtering cone presently to be described is secured. The entire mechanism so far described including the motor, shaft, and bearings are mounted within the housing 19.

The filtering cone indicated generally at 20 terminates in a plate 21 which may be securely fastened to the flange member 18 on the end of the driving shaft. The filtering cone rotates within a housing 22 which is formed with suitable brace members 23.

The front end of the housing 22 is closed by a door member 24, hingedly mounted to the frame 22 in any suitable manner such as shown at 25. The door 24 has an integrally formed loading tube 26. The outer end of the tube indicated at 26a will be in communication with a continuous supply of the product to be centrifuged, while the inner end of the tube is securely fastened to a second tube 27 which, for a part of its length, will be in alignment with the axis of the filtering cone. It should be understood that while I have found this two-piece method of construction to be particularly satisfactory, the loading tube could equally well be formed from a single tube having the same general overall configuration. As shown in dotted lines in FIGURE 1, the door 24 and the integral loading tube 26 may be swung outwardly. This of course, permits quick and easy access to the inner surface of the filtering cone.

The housing 22 is provided with a discharge conduit 22a located beyond the base of the filtering cone which can communicate with a collecting conveyor, or any other suitable receptacle.

Coming now to FIGURES 2, 3, 4 and 5, I shall describe the filtering cone which has been generally indicated at 20 in more detail. It will be apparent that the filtering cone 20 would be more properly described as frusto-conical; and it should therefore be understood that hereinafter the term "cone" is used merely for convenience, and not in a purely descriptive sense. Similarly, the smaller end or top of the frusto-conical filtering member will be referred to as the "apex." The filtering surface is composed of four separate and distinct layers. The outermost layer is provided by the perforated basket 28. The basket may be formed of stainless steel or any other suitable material which is capable of withstanding the stresses of high speed operation. As seen in FIGURE 3 (and FIGURE 1) the basket 28 is provided with a plurality of annular strengthening ribs 29. The innermost layer of the filtering surface is a very fine screen 30. For my own purposes I prefer to use a nickel screen having a hard chrome finish to resist abrasion, and with microscopic conical holes formed by an electrolytic process. The total open area of a screen formed in this manner will be approximately 20%. It should therefore be apparent that if the fine screen were placed directly over the basket 28, the effective open area of the fine screen would be greatly reduced. To alleviate this difficulty, I provide two intermediate screen layers. For purposes of example, the outermost of these two layers, shown at 31, may be considered a five mesh screen, and the innermost of these two layers, shown at 32, may be considered a ten mesh screen.

The manner in which these screen layers are secured to the basket is very important to my invention. As shown in FIGURE 2, the base of the basket 28 is provided with a peripheral flange 33. The joint between the inner surface of the basket 28 and the flange 33 forms a shoulder 34 against which the five mesh screen 31 is abutted. It will also be seen in FIGURE 2 that the ten mesh screen 32 and the fine inner screen 30 extend into a slot or groove 35 in the flange 33.

As shown in FIGURE 3, the inner surface of the basket 28 is provided with a plurality of ribs 36 at its loading end. It will also be noted that the five mesh screen 31 is abutted against the rib 36 nearest the base of the basket, while the ten mesh screen 32 and the fine screen 30 extend over all three of the ribs 36 indicated in FIGURE 3.

As shown in FIGURES 4 and 5, the five mesh and ten mesh screens 31 and 32 are secured to the basket by means of the short screws 37. This assembly comprising the basket 28 and the screens 31 and 32 which are secured in place with the screws 37, is relatively permanent. The fine screen 30 on the other hand must be periodically replaced. To simplify replacement of the screen 30 it will be noted that it is held in place at the apex by only the accelerating loading cup 38 which will be more fully described hereinafter, and at the base by the slot 35.

The operation of my device may now be readily understood. A supply of solid-liquid slurry is continuously metered into the open end 26a of the loading tube 26. In FIGURE 1a I have shown in perspective a conventional butterfly valve at 39 and in FIGURE 1b I have shown diagrammatically a conventional positive displacement pump which provides a volumetric feed. In the case of the butterfly valve the rate of feed should be correlated to the motor load to insure an even quality product. The butterfly valve 39 and the volumetric feed 40 are both conventional, and form no part of this invention; hence the details of construction will not be described.

The solid-liquid slurry will pass through the tubes 26 and 27 and will be discharged at 27a into the accelerating cup 38. Various designs for accelerating cups are presently known and utilized in the industry.

The centrifugal action of the rapidly rotating filtering cone will tend to push the slurry leaving the accelerating cup toward the base of the cone. As the slurry progresses, the liquids will strike through the screens 30, 32, 31 and the basket 28. These liquids may be removed to any suitable conduit (not shown). The solid material will continue to move along the surface of the fine screen 30 until it reaches the base of the filtering cone, at which point it will fly outwardly into the space designated at 41 in FIGURE 1, and may be collected and discharged via the outlet 22a.

To effectively seal the area 41 from that portion of the housing 22 in which the liquids are collected, I provide the annular member 42 which may be secured to the strengthening wall 23 of the housing in any suitable manner. This annular member 42, in conjunction with the flange 33 on the basket forms a labyrinth type seal. It will also be seen that I provide an annular deflecting ring 43 in the chamber into which the liquids are discharged. This deflecting ring tends to keep all liquid which has struck through the filtering cone away from the area of the seal.

When through continued operation, it becomes necessary to replace the fine screen 30, it may be done in the following manner. The door 25 and the loading tubes 26 and 27 may be swung outwardly on the hinge 25. This will render the entire inner surface of the filtering cone easily accessible. The bolt 44 which secures the accelerating cup 38 to the plate 21 must be removed and the accelerating cup itself may then be taken out. This will free one end of the fine screen 30, which may then be completely removed by pulling it out of the slot 35 in the flange 33. The replacement screen will be in the form of a flat cut-out. The design of the cut-out will simply be a plane surface which may be developed into a cone having the desired angular configuration. The flat screen will be formed into a cone and placed inside the basket in the proper position. It will be understood that the edges of the plane surface will overlap. And, of course, the direction of overlap will be made with respect to the direction of rotation of the filtering cone. That is, if the cone as shown in FIGURE 4 is rotating in a clockwise direction, the edge 30a must overlap the opposing edge 30b. The accelerating cup is then placed in its proper position with respect to the ribs 36 inside the basket. As shown in FIGURES 1 and 3, I provide a pin 45 which will constrain the accelerating cup 38 against rotation as the bolt 44 is tightened. This feature is very important, since without the pin, the cup would tend to turn as the bolt is tightened, and this would tend to buckle the screen 30. At the base of the filtering cone, the screen 30 is tucked into the slot 35 in the flange 33. As shown in FIGURE 2, the ten mesh screen 32 is also tucked into the slot 35. This is to prevent the free ends of the screen 32 from puncturing the fine screen 30.

It will now be apparent that the fine screen 30, though held in position, is free to expand or move slightly in two directions. It may expand circumferentially by virtue of the overlapping joint indicated at 30a, 30b; and it may expand longitudinally into the slot 35. By this construction, I have found that the screen 30 will remain absolutely smooth under all operating conditions. This, of course, greatly increases the life of this member. Furthermore, as will be noted from the foregoing description, its replacement is a relatively simple procedure—it may take a matter of only five minutes and requires no special tools. On the other hand, centrifugal separators currently in operation often require numerous special tools to effect replacement of the fine screen, and obviously, that operation involves a great deal more time.

As noted in the description of the operation of my device, the solid material will move along the surface of the inner screen 30 until it reaches the periphery of the base of the filtering cone. It will be apparent that upon reaching the area of the slot 35, some of the particles of solid material will force themselves down into the slot. For this reason, I have found that the slot 35 may be relatively large in comparison to the thickness of the two screens which are inserted therein. The tightly packed solid material which has forced itself into this slot then serves to securely hold the screen members in position.

In FIGURE 6, I have shown a slight modification of my invention in order to combine centrfuging and air drying. The changes involved in this modification are primarily in the inside of the housing structure 22. As is clearly shown in FIGURE 6, the interior of the housing 22 is divided into two compartments, designated respectively 50 and 51. The inner compartment 51 is formed by conical wall 52 which is connected to the housing 22. The lowermost portion of the compartment 51 is provided with a discharge conduit 53 through which the liquid striking through the filtering cone may be collected. Similarly, the lowermost portion of the chamber 50 is provided with a discharge conduit 54 which will be connected to a powerful air suction fan having a filter (not shown). The front wall of the housing 22 is provided with air inlets 55, in which are mounted suitable heating elements 56. The heating elements 56 may be of any known construction, including both electrical resistance heaters or steam tubes. As the material is discharged at the flange 42 at the base of the filtering cone, it will travel radially outward in straight lines. It will then be met, however, with a stream of warm air travelling at right angles to it. The juncture of these two streams will serve to dry the solid particles, and also to prevent or reduce the arm which occurs to the solid particles when they strike the housing 22 at high speed.

While I have described my invention in terms of a certain particular embodiment, it is to be understood that this structure is exemplary only and I do not intend to limit myself except as set forth in the following claims. It will also be apparent to those skilled in the art that numerous changes in this structure may be made without departing from the spirit and scope of my invention.

What I claim as new and what I desire to protect by United States Letters Patent is:

1. A centrifugal separator comprising (a) a frame, (b) a filtering cone mounted on said frame for rotational movement about a horizontal axis, said filtering cone including a frusto-conical perforated basket terminating at its base in a peripheral flange having an annular groove, at least one layer of relatively coarse screening covering the inner surface of said basket, independent means for securing said screening to said basket, a very fine screen covering said relatively coarse screening, the edge of said very fine screening adjacent the base of said basket being engaged in the annular groove of said flange, and additional independent means for securing said very fine screen to the apex of said basket, whereby said very fine screening can be removed without substantially disturbing said relatively coarse screening, (c) means for rotating said cone, (d) a housing enclosing said frame, said filtering cone, and said means for driving said filtering cone, said housing having a door and a discharge outlet, and (e) at loading tube for introducing a slurry to be centrifuged to the apex of said cone, said tube being secured to said door, whereby when said door is open said filtering cone is freely accessible.

2. The centrifugal separator claimed in claim 1 wherein said means for detachably securing said very fine screen to the apex of said basket comprises an accelerating cup, the outer surface of said cup defining a frustrum of a cone adapted to mate with the inner surface of said basket at the apex thereof, and means coaxial with said horizontal axis of said basket for securing said accelerating cup to said basket, whereby said screen may be secured between the outer surface of said cup and the inner surface of said basket.

3. The centrifugal separator claimed in claim 2 including means to prevent rotation of said accelerating cup relative to said basket.

4. The centrifugal separator claimed in claim 3 including means for metering said slurry to be centrifuged to said loading tube in measured relation to the load on said means for rotating said cone.

5. The centrifugal separator claimed in claim 1 including means for air drying the solid products of centrifugation.

6. The centrifugal separator claimed in claim 5 wherein said means for air drying the products of centrifugation comprise an air opening in said housing, heating means disposed in said air opening, and a suction fan connected to said discharge outlet.

7. The improvement claimed in claim 1 wherein said very fine screen is formed from a plane figure having two straight edges and two curved edges which may be developed into a frustrum of a cone, the straight edges of said plane figure being overlapped when so developed with respect to the direction of rotation of said basket that the leading edge is innermost.

8. A filtering cone for a centrifugal separator, said cone comprising:
    (a) a frusto-conical basket,
    (b) an annular flange at the base of said basket,
    (c) an annular groove in said flange,
    (d) at least one layer of relatively coarse screening covering the inner surface of said basket and independent means for securing said screening to said basket,
    (e) a very fine screen covering said layer of relatively coarse screening, the edge of said very fine screen adjacent the base of said basket being engaged in said groove in said flange, and
    (f) additional independent means for securing said very fine screen to the apex of said basket whereby said very fine screen can be removed without substantially disturbing said relatively coarse screening.

9. The filtering cone claimed in claim 8 including a second layer of relatively coarse screening covering said first layer of relatively coarse screening, said second layer of screening being not so coarse as said first layer of said screening, said first and second layers of screening being secured to said basket.

10. The filtering cone claimed in claim 9 including at least one annular rib disposed between the mating surfaces of said basket and said means for detachably securing said very fine screen to the apex of said basket.

References Cited by the Examiner

UNITED STATES PATENTS

| | | | |
|---|---|---|---|
| 930,898 | 8/1909 | Steinmann | 34—58 |
| 1,770,854 | 7/1930 | Johnson | 210—380 |
| 1,936,866 | 11/1933 | Van Ackeren | 34—58 |
| 2,254,455 | 9/1941 | Sorenson | 210—369 X |
| 2,335,794 | 11/1943 | Sanchez | 210—369 |
| 2,893,562 | 7/1959 | McPhee | 210—380 |
| 3,136,721 | 6/1964 | Gooch | 210—380 X |
| 3,151,072 | 9/1964 | Dietzel et al. | 210—380 |

FOREIGN PATENTS

| | | |
|---|---|---|
| 1,784,677 | 3/1959 | Germany. |
| 14,173 | 10/1901 | Great Britain. |
| 19,123 | 11/1913 | Great Britain. |
| 856,183 | 12/1960 | Great Britain. |

JOHN J. CAMBY, *Acting Primary Examiner.*

NORMAN YUDKOFF, WILLIAM F. O'DEA, *Examiners*

W. C. EVERETT, J. J. CAMBY, *Assistant Examiners.*